United States Patent
Tang et al.

(10) Patent No.: US 7,692,877 B2
(45) Date of Patent: Apr. 6, 2010

(54) OPTICAL LENS SYSTEM FOR TAKING IMAGE

(75) Inventors: Hsiang Chi Tang, Taichung (TW); Chun Shan Chen, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 103 days.

(21) Appl. No.: 12/185,078

(22) Filed: Aug. 2, 2008

(65) Prior Publication Data
US 2009/0207506 A1 Aug. 20, 2009

(30) Foreign Application Priority Data
Feb. 18, 2008 (TW) .............................. 97105621 A

(51) Int. Cl.
*G02B 9/34* (2006.01)
*G02B 3/02* (2006.01)

(52) U.S. Cl. ................... 359/773; 359/771; 359/772; 359/715

(58) Field of Classification Search ............ 359/715, 359/771, 772, 773
See application file for complete search history.

(56) References Cited

U.S. PATENT DOCUMENTS

| 7,274,518 | B1 * | 9/2007 | Tang et al. | ................ 359/772 |
| 7,277,238 | B2 * | 10/2007 | Noda | ................ 359/715 |
| 7,355,801 | B2 * | 4/2008 | Chen et al. | ................ 359/773 |

* cited by examiner

*Primary Examiner*—David N Spector
(74) *Attorney, Agent, or Firm*—Banger Shia

(57) ABSTRACT

An optical lens system for taking image comprises four lens elements from the object side to the image side: a first lens element with positive refractive power having a convex object-side surface; a second lens element with negative refractive power having a concave object-side surface and a concave image-side surface, at least one of the object-side surface and the image-side surface of the second lens element being aspheric, inflection points being formed on the image-side surface of the second lens element; a third lens element with positive refractive power having a convex object-side surface and a convex image-side surface; a fourth lens element with negative refractive power; and an aperture stop being located between the object side and the second lens element.

20 Claims, 6 Drawing Sheets

OPTICAL LENS SYSTEM FOR TAKING IMAGE

BACKGROUND OF THE INVENTION

1. Field of the Invention

The present invention relates to an optical lens system for taking image, and more particularly to a miniaturized optical lens system for taking image used in a mobile phone camera.

2. Description of the Prior Art

In recent years, with the popularity of the mobile phone camera, the optical lens system for taking image has become thinner and thinner, and the electronic imaging sensor of a general digital camera is typically a CCD (Charge Coupled Device) or CMOS (Complementary Metal Oxide Semiconductor) sensor. Due to advances in semiconductor manufacturing, the pixel size of sensors has been reduced continuously, and miniaturized optical lens systems for taking image have increasingly higher resolution. Therefore, there's increasing demand for image quality.

A conventional mobile phone camera usually consists of three lens elements: from the object side to the image side: a first lens element with positive refractive power, a second lens element with negative refractive power and a third lens element with positive refractive power, such as the optical lens system for taking image described in U.S. Pat. No. 7,145,736.

As the pixel size of electronic imaging sensors gradually becomes smaller and smaller, the system requires higher image quality. The conventional optical lens system consisting of three lens elements cannot satisfy the requirements of higher resolution optical lens systems.

An optical lens system for taking image disclosed in U.S. Pat. No. 7,277,238 consists of four lens elements and has a better resolution. However, the fourth lens element is a positive lens element in such a manner that the principal point is located close to the image side of the system, so the back focal length is longer than that of the telephoto type optical lens system whose fourth lens element is a negative lens element. In addition, only the fourth lens element in the optical lens system is negative, so it is poor for correcting the Petzval Sum of the system, making it more difficult to control image quality.

The present invention mitigates and/or obviates the aforementioned disadvantages.

SUMMARY OF THE INVENTION

The primary objective of the present invention is to provide a new optical lens system consisting of four lens elements for taking image to improve image quality, and effectively reduce the volume of the optical lens system.

An optical lens system for taking image in accordance with the present invention consists of: in order from the object side to the image side: a first lens element with positive refractive power having a convex object-side surface; a second lens element with negative refractive power having a concave object-side surface and a concave image-side surface, at least one of the object-side surface and the image-side surface of the second lens element being aspheric, inflection points being formed on the image-side surface of the second lens element; a third lens element with positive refractive power having a convex object-side surface and a convex image-side surface; a fourth lens element with negative refractive power, at least one surface of the fourth lens element being aspheric; and an aperture stop being located between the object side and the second lens element. Such arrangements can effectively improve image quality.

By alternating lens elements with positive and negative refractive powers, the total track length of the optical lens system can be effectively reduced. The first lens element provides a positive refractive power, and the aperture stop is located close to the object side, so that the exit pupil of the optical lens system will be far away from the image plane. Therefore, the light will be projected onto the sensor with a relatively small incident angle, this is the telecentric feature of the image side, and this feature is very important to the photosensitive power of current solid-state sensors, since they are more sensitive when the light is incident at a small angle. This also reduces the probability of the occurrence of shading. The inflection points formed on the image-side surface of the third lens element will contribute to a better correction of the incident angle of the off axis light with respect to the sensor.

In the present optical lens system for taking image, if the aperture stop is located in front of the first lens element, the telecentric feature of the optical lens system becomes obvious. If the aperture stop is located between the first and second lens elements, then for an optical system with wide field of view, various aberrations such as distortion and chromatic aberration of magnification can be better corrected, and the optical system is less sensitive as well. In addition, the on-axis distance between the second lens element and the third lens element is T23, the focal length of the optical lens system for taking image is f, and they satisfy the relation: $0.015 < T23/f < 0.25$.

The above relation is beneficial for correcting the astigmatism of the optical lens system.

In the present optical lens system for taking image, the lens elements can be made of glass or plastic. The lens elements are provided with aspheric surfaces, allowing more design parameters (than spherical surfaces), so as to better reduce the aberration and the number of the lens elements, thus effectively reducing the total track length of the optical lens system.

In the present optical lens system for taking image, the focal length of the first lens element and the second lens element combined is f12, the focal length of the optical lens system for taking image is f, the focal length of the first lens element is f1, and they satisfy the relation:

$$3.0 < f12/f < 8.0.$$

If the value of f12/f is greater than the above upper limit, the refractive power of the system will be weak, the total track length of the system will be too long, and it will be difficult to suppress the incident angle of the light with respect to the sensor; and if the value of f12/f is smaller than the above lower limit, the high order aberration of the system will be too large. Further, it will be better if f12, f and f1 satisfy the relations:

$$0.5 < f/f1 < 1.2;$$

$$4.55 < f12/f < 7.0;$$

Further, it will be best if f/f1 satisfies the relation:

$$0.65 < f/f1 < 0.9.$$

In the present optical lens system for taking image, the edge thickness of the fourth lens element is ET4, the center thickness of the fourth lens element is CT4, and they satisfy the relation:

$$ET4/CT4 > 1.8.$$

The above relation can effectively correct the Petzval Sum of the system and can effectively improve the image quality.

The edge thickness is: the distance between two planes normal to the lens axis, the first of which is defined as the plane passing through points on the lens front surface at the position of its effective radius, and the second defined as the plane passing through points on the lens rear surface at the position of its effective radius.

In the present optical lens system for taking image, the radius of curvature of the object-side surface of the first lens element is R1, the radius of curvature of the image-side surface of the first lens element is R2, the radius of curvature of the object-side surface of the third lens element is R5, and they satisfy the relations:

$|R1/R2|<0.15;$ $0<1/R5<0.05$ mm$^{-1}$

The above relations can effectively correct the spherical aberration of the system. Further, it will be better if R5 satisfies the relation:

$0<1/R5<0.025$ mm$^{-1}$

In the present optical lens system for taking image, the refractive index of the first lens element is N1, and it satisfies the relation:

$1.5<N1<1.56.$

If the refractive index of the first lens element satisfies the above relation, the plastic optical material with the refractive index within the above range will better match the optical lens system. Further, it will be better if the refractive index of the first lens element satisfies the relation:

$1.52<N1<1.56.$

In the present optical lens system for taking image, the Abbe number of the second lens element is V2, and it satisfies the relation:

$V2<29.$

The above relation can effectively correct the chromatic aberration caused by the system, and improve the resolution of the system.

In the present optical lens system for taking image, the tangential angle of the object-side surface of the fourth lens element at the position of its effective optical diameter is ANG41, and it satisfies the relation:

$ANG41<-25$ deg.

The above relation can effectively reduce the incident angle of the off axis light with respect to the sensor, and allow better correction of the off-axis aberration of the system.

The tangential angle at a point on the surface of a lens is defined as the angle between the tangential plane, Plane Tan, passing through that point and a plane, Plane Norm, normal to the optical axis and passing through that point. Let T and N be the points of intersection between the optical axis and these two planes Plane Tan and Plane Norm, respectively. This tangential angle is less than 90 degree in absolute value. The sign of the tangential angle is taken to be negative if N is closer than T to the object side of the optical lens system, and positive otherwise.

In the present optical lens system for taking image, the optical lens system for taking image further consists of an electronic imaging sensor for enabling an object to be photographed to be imaged on it, a total track length of the optical lens system for taking image is TTL, a maximum image height of the optical lens system for taking image is ImgH, and they satisfy the relation:

$TTL/ImgH<2.55.$

The above relation can maintain the objective of miniaturization of the optical lens system for taking image.

The present invention will become more obvious from the following description when taken in connection with the accompanying drawings, which show, for purpose of illustration only, the preferred embodiments in accordance with the present invention.

DETAILED DESCRIPTION OF THE PREFERRED EMBODIMENTS

Figure 1:
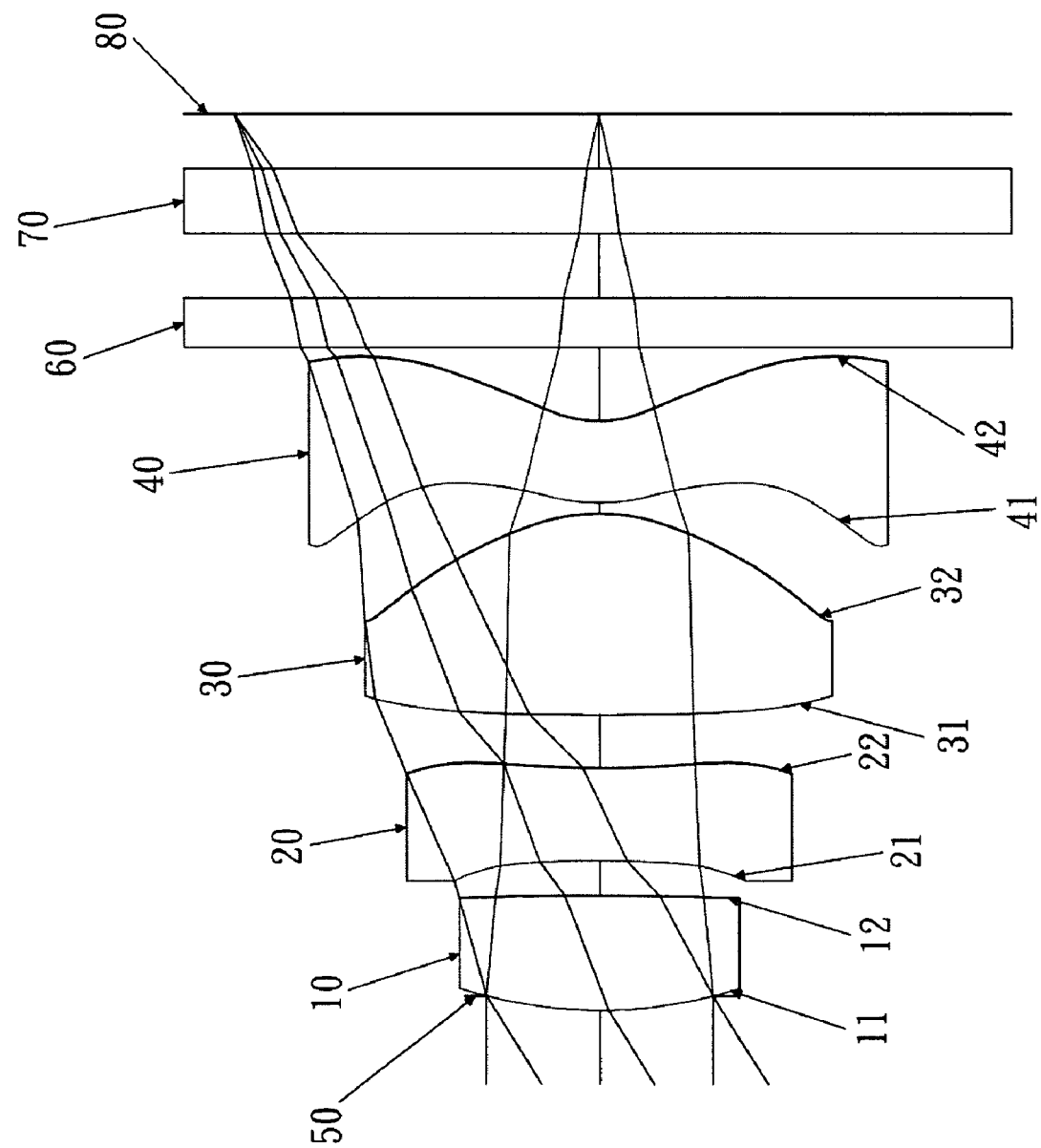
FIG. 1 shows an optical lens system for taking image in accordance with a first embodiment of the present invention.
Figure 2:
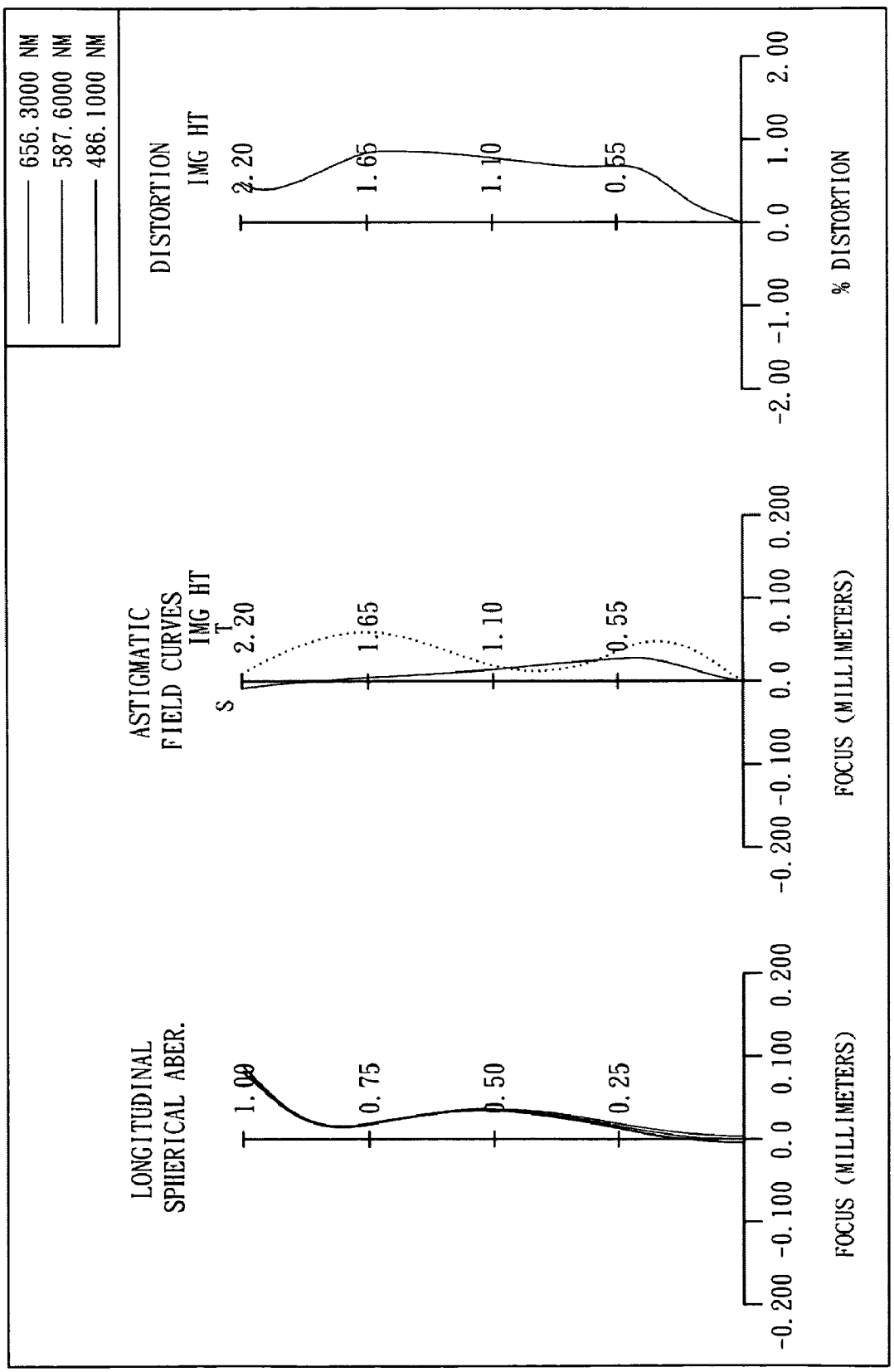
FIG. 2 shows the aberration curve of the first embodiment of the present invention.

Referring to FIG. 1, which shows an optical lens system for taking image in accordance with a first embodiment of the present invention, and FIG. 2 shows the aberration curve of the first embodiment of the present invention. An optical lens system for taking image in accordance with the first embodiment of the present invention comprises: in order from the object side to the image side:

A plastic first lens element 10 with positive refractive power has a convex object-side surface 11 and a convex image-side surface 12, and the object-side surface 11 and the image-side surface 12 of the first lens element 10 are both aspheric.

A plastic second lens element 20 with negative refractive power has a concave object-side surface 21 and a concave image-side surface 22, the object-side surface 21 and the image-side surface 22 of the second lens element 20 are both aspheric, and inflection points are formed on the image-side surface 22 of the second lens element 20.

A plastic third lens element 30 with positive refractive power has a convex object-side surface 31 and a convex image-side surface 32, the object-side surface 31 and the image-side surface 32 are both aspheric.

A plastic fourth lens element 40 with negative refractive power has a convex object-side surface 41 and a concave image-side surface 42, the object-side surface 41 and the image-side surface 42 are both aspheric.

An aperture stop 50 is located in front of the first lens element 10.

An IR cut filter 60 is located behind the fourth lens element 40 and has no influence on the focal length of the optical lens system.

A sensor cover glass 70 is located behind the IR cut filter 60 and has no influence on the focal length of the optical lens system.

An image plane 80 is located behind the sensor cover glass 70.

The equation for the aspheric surface profiles of the first embodiment is expressed as follows:

$$X(Y) = (Y^2/R)/(1+sqrt(1-(1+k)*(Y/R)^2)) + \sum_i (Ai)*(Y^i)$$

wherein:

X: the height of a point on the aspheric lens surface at a distance Y from the optical axis, relative to the tangential plane of the aspheric surface vertex;

Y: the distance from the point on the curve of the aspheric surface to the optical axis;

k: the conic coefficient;

Ai: the aspheric surface coefficient of order i.

In the first embodiment of the present optical lens system for taking image, the focal length of the optical lens system for taking image is f, the focal length of the first lens element and the second lens element combined is f12, the on-axis distance between the second lens element and the third lens element is T23, and they satisfy the relations:

$f=3.40$ mm;

$f12/f=4.57$;

$f/f1=0.73$;

$T23/f=0.10$.

In the first embodiment of the present optical lens system for taking image, the refractive index of the first lens element is N1, and it satisfies the relation:

$N1=1.544$.

In the first embodiment of the present optical lens system for taking image, the Abbe number of the second lens element is V2, and it satisfies the relation:

$V2=23.4$.

In the first embodiment of the present optical lens system for taking image, the radius of curvature of the object-side surface of the third lens element is R5, and it satisfies the relation:

$1/R5=0.02$ mm$^{-1}$

In the first embodiment of the present optical lens system for taking image, the radius of curvature of the object-side surface of the first lens element is R1, the radius of curvature of the image-side surface of the first lens element is R2, and they satisfy the relation:

$|R1/R2|=0.11$.

In the first embodiment of the present optical lens system for taking image, the edge thickness of the fourth lens element is ET4, the center thickness of the fourth lens element is CT4, and they satisfy the relation:

$ET4/CT4=2.02$.

In the first embodiment of the present optical lens system for taking image, the tangential angle of the object-side surface of the fourth lens element at the position of its effective optical diameter is ANG41, and it satisfies the relation:

$ANG41=-37.6$ deg.

In the first embodiment of the present optical lens system for taking image, the total track length of the optical lens system for taking image is TTL, the maximum image height of the optical lens system for taking image is ImgH, and they satisfy the relation:

i $TTL/ImgH=2.51$.

The detailed optical data of the first embodiment is shown in table 1, and the aspheric surface data is shown in table 2, wherein the units of the radius of curvature, the thickness and the focal length are expressed in mm, and HFOV is half of the maximal field of view.

TABLE 1

(Embodiment 1)
f(focal length) = 3.40 mm, Fno = 2.43, HFOV (half of field of view) = 32.6 deg.

| Surface # | | Curvature Radius | Thickness | Material | Index | Abbe # | Focal length |
|---|---|---|---|---|---|---|---|
| 0 | Object | Plano | Infinity | | | | |
| 1 | Aperture Stop | Plano | −0.077 | | | | |
| 2 | Lens 1 | 2.80322(ASP) | 0.713 | Plastic | 1.544 | 56.1 | 4.67 |
| 3 | | −24.44750(ASP) | 0.216 | | | | |
| 4 | Lens 2 | −14.25610(ASP) | 0.567 | Plastic | 1.632 | 23.4 | −5.39 |
| 5 | | 4.54770(ASP) | 0.331 | | | | |
| 6 | Lens 3 | 50.00000(ASP) | 1.232 | Plastic | 1.544 | 56.1 | 2.03 |
| 7 | | −1.11732(ASP) | 0.073 | | | | |
| 8 | Lens 4 | 1.48367(ASP) | 0.486 | Plastic | 1.583 | 30.2 | −2.87 |
| 9 | | 0.69212(ASP) | 0.450 | | | | |
| 10 | IR-filter | Plano | 0.300 | Glass | 1.517 | 64.1 | |
| 11 | | Plano | 0.400 | | | | |
| 12 | Cover Glass | Plano | 0.400 | Glass | 1.517 | 64.1 | |
| 13 | | Plano | 0.339 | | | | |
| 14 | Image | Plano | | | | | |

TABLE 2

Aspheric Coefficients

| | Surface # | | | | | | | |
|---|---|---|---|---|---|---|---|---|
| | 2 | 3 | 4 | 5 | 6 | 7 | 8 | 9 |
| k = | 1.14523E+00 | −5.35460E+02 | 0.00000E+00 | −1.10611E+01 | −1.00000E+00 | −6.61361E−01 | −1.07808E+01 | −3.44742E+00 |
| A4 = | 2.86108E−03 | 6.14537E−03 | −1.08533EE−01 | −4.26824E−02 | 9.84599E−02 | 1.34874E−01 | −1.13378E−01 | −1.12789E−01 |
| A6 = | 4.20486EE−02 | −6.59610E−03 | −1.21850E−02 | −6.59883E−02 | −1.41043E−01 | −3.73874E−02 | 1.32204E−02 | 4.18782E−02 |
| A8 = | −4.83396E−02 | −9.48735E−03 | −6.07964E−02 | 6.12548E−02 | 9.23201E−02 | −1.08985E−02 | −1.33022E−02 | −1.26833E−02 |
| A10 = | | | | −3.48610E−02 | −2.64167E−02 | 1.03037E−02 | 4.40579E−03 | 2.09569E−03 |
| A12 = | | | | 6.19379E−03 | 3.02122E−03 | | −1.98493E−05 | −1.16763E−04 |

Figure 3:
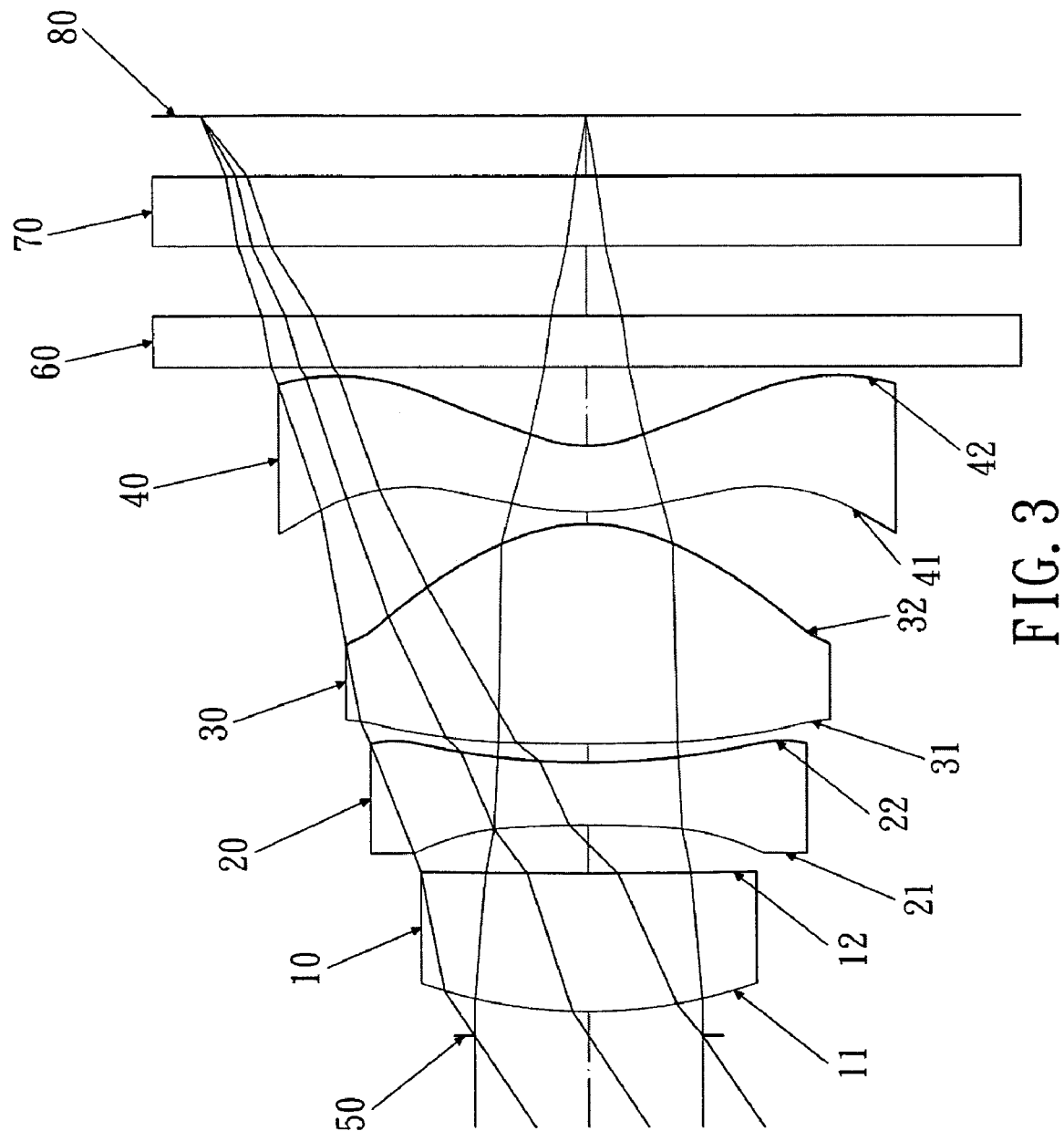
FIG. 3 shows an optical lens system for taking image in accordance with a second embodiment of the present invention.
Figure 4:
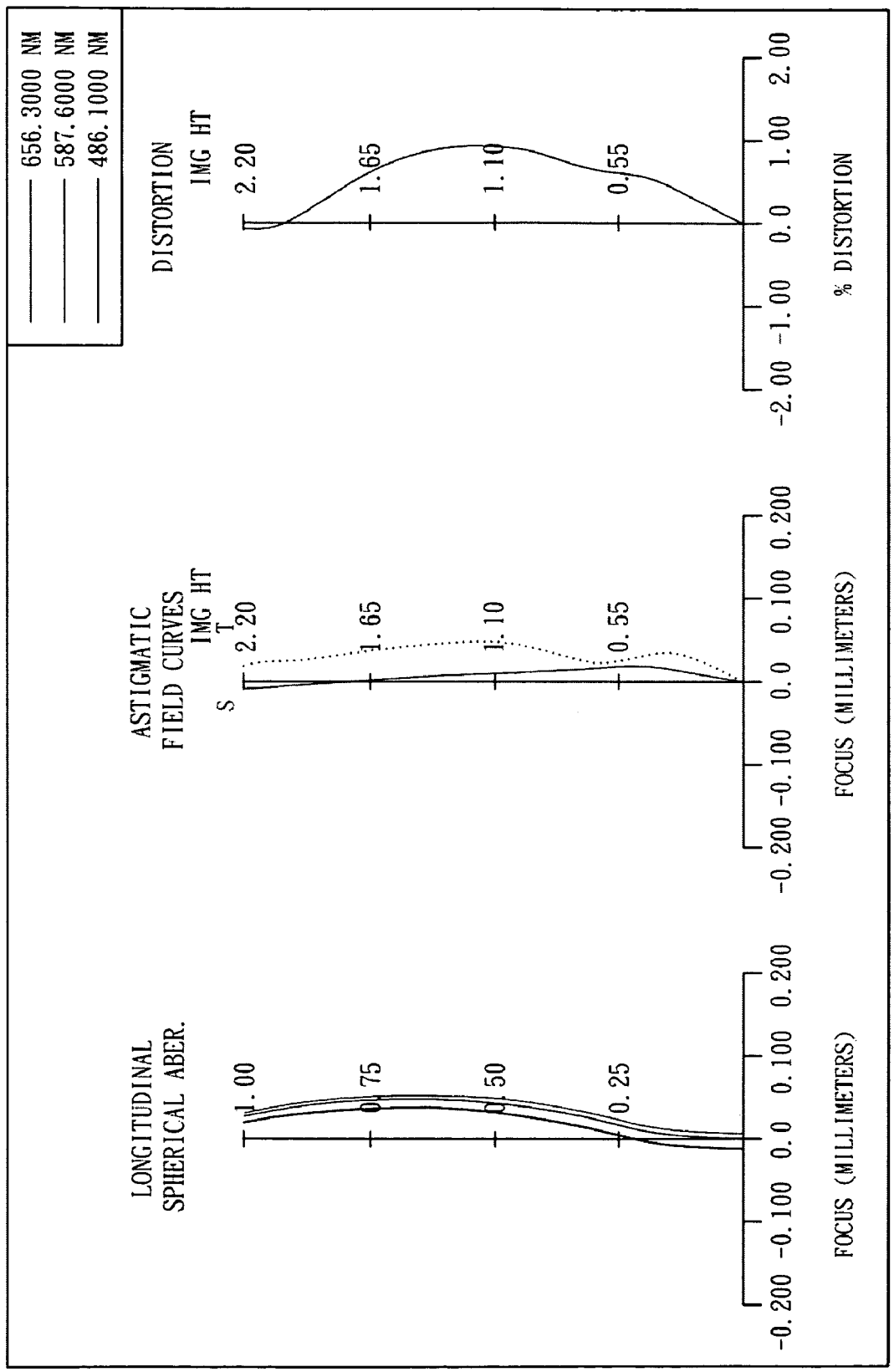
FIG. 4 shows the aberration curve of the second embodiment of the present invention.

Referring to FIG. 3, which shows an optical lens system for taking image in accordance with a second embodiment of the present invention, and FIG. 4 shows the aberration curve of the second embodiment of the present invention. The second embodiment of the present invention comprises: in order from the object side to the image side:

A first lens element 10 with positive refractive power has a convex object-side surface 11 and a concave image-side surface 12 and is made of glass, the object-side surface 11 and the image-side surface 12 of the first lens element 10 are both spherical.

A plastic second lens element 20 with negative refractive power has a concave object-side surface 21 and a concave image-side surface 22, the object-side surface 21 and the image-side surface 22 of the second lens element 20 are both aspheric, and inflection points are formed on the image-side surface 22 of the second lens element 20.

A plastic third lens element 30 with positive refractive power has a convex object-side surface 31 and a convex image-side surface 32, the object-side surface 31 and the image-side surface 32 are both aspheric.

A plastic fourth lens element 40 with negative refractive power has a convex object-side surface 41 and a concave image-side surface 42, the object-side surface 41 and the image-side surface 42 are both aspheric.

An aperture stop 50 is located in front of the first lens element 10.

An IR cut filter 60 is located behind the fourth lens element 40 and has no influence on the focal length of the optical lens system.

A sensor cover glass 70 is located behind the IR cut filter 60 and has no influence on the focal length of the optical lens system.

An image plane 80 is located behind the sensor cover glass 70.

The equation for the aspheric surface profiles of the second embodiment has the same form as that of the first embodiment.

In the second embodiment of the present optical lens system for taking image, the focal length of the optical lens system for taking image is f, the focal length of the first lens element and the second lens element combined is f12, the on-axis distance between the second lens element and the third lens element is T23, and they satisfy the relations:

f=3.23 mm;

f12/f=6.20;

f/f1=0.78;

T23/f=0.03.

In the second embodiment of the present optical lens system for taking image, the refractive index of the first lens element is N1, and it satisfies the relation:

N1=1.729.

In the second embodiment of the present optical lens system for taking image, the Abbe number of the second lens element is V2, and it satisfies the relation:

V2=30.2.

In the second embodiment of the present optical lens system for taking image, the radius of curvature of the object-side surface of the third lens element is R5, and it satisfies the relation:

1/R5=0.01 mm$^{-1}$

In the second embodiment of the present optical lens system for taking image, the radius of curvature of the object-side surface of the first lens element is R1, the radius of curvature of the image-side surface of the first lens element is R2, and they satisfy the relation:

|R1/R2|=0.08.

In the second embodiment of the present optical lens system for taking image, the edge thickness of the fourth lens element is ET4, the center thickness of the fourth lens element is CT4, and they satisfy the relation:

ET4/CT4=1.90.

In the second embodiment of the present optical lens system for taking image, the tangential angle of the object-side surface of the fourth lens element at the position of its effective optical diameter is ANG41, and it satisfies the relation:

ANG41=−28.1 deg.

In the second embodiment of the present optical lens system for taking image, the total track length of the optical lens system for taking image is TTL, the maximum image height of the optical lens system for taking image is ImgH, and they satisfy the relation:

TTL/ImgH=2.38.

The detailed optical data of the second embodiment is shown in table 3, and the aspheric surface data is shown in table 4, wherein the units of the radius of curvature, the thickness and the focal length are expressed in mm, and HFOV is half of the maximal field of view.

TABLE 3

(Embodiment 2)
f(focal length) = 3.23 mm, Fno = 2.43, HFOV (half of field of view) = 34.0 deg.

| Surface # | | Curvature Radius | Thickness | Material | Index | Abbe # | Focal length |
|---|---|---|---|---|---|---|---|
| 0 | Object | Plano | Infinity | | | | |
| 1 | Stop | Plano | 0.15 | | | | |
| 2 | Lens 1 | 2.7983 | 0.816 | Glass | 1.729 | 54.6 | 4.13 |
| 3 | | 35.0000 | 0.302 | | | | |
| 4 | Lens 2 | −10.06520(ASP) | 0.350 | Plastic | 1.583 | 30.2 | −3.97 |
| 5 | | 3.04230(ASP) | 0.110 | | | | |
| 6 | Lens 3 | 100.00000(ASP) | 1.276 | Plastic | 1.544 | 56.1 | 1.87 |

TABLE 3-continued (Embodiment 2)
f(focal length) = 3.23 mm, Fno = 2.43, HFOV (half of field of view) = 34.0 deg.

| Surface # | | Curvature Radius | Thickness | Material | Index | Abbe # | Focal length |
|---|---|---|---|---|---|---|---|
| 7 | | −1.02122(ASP) | 0.070 | | | | |
| 8 | Lens 4 | 1.35002(ASP) | 0.392 | Plastic | 1.583 | 30.2 | −3.20 |
| 9 | | 0.69964(ASP) | 0.450 | | | | |
| 10 | IR-filter | Plano | 0.300 | Glass | 1.517 | 64.1 | |
| 11 | | Plano | 0.400 | | | | |
| 12 | Cover glass | Plano | 0.400 | Glass | 1.517 | 64.1 | |
| 13 | | Plano | 0.349 | | | | |
| 14 | Image | Plano | | | | | |

TABLE 4

Aspheric Coefficients

| | Surface # | | | | | |
|---|---|---|---|---|---|---|
| | 4 | 5 | 6 | 7 | 8 | 9 |
| k = | 0.00000E+00 | 1.55208E+00 | −1.00000E+00 | −6.64430E−01 | −1.03907E+01 | −3.74116E+00 |
| A4 = | −1.65663E−01 | −2.21979E−02 | 1.55053E−01 | 1.46958E−01 | −8.17303E−02 | −9.58413E−02 |
| A6 = | 6.18343E−02 | −6.03903E−02 | −1.50117E−01 | −3.31116E−02 | 1.77889E−02 | 3.44796E−02 |
| A8 = | −1.72235E−02 | 5.98651E−02 | 9.04414E−02 | −8.00862E−03 | −1.13993E−02 | −1.16108E−02 |
| A10 = | | −2.94021E−02 | −2.80318E−02 | 1.07246E−02 | 3.59657E−03 | 2.26776E−03 |
| A12 = | | 1.96156E−03 | 2.40685E−03 | | −3.27151E−04 | −1.80733E−04 |

Figure 5:
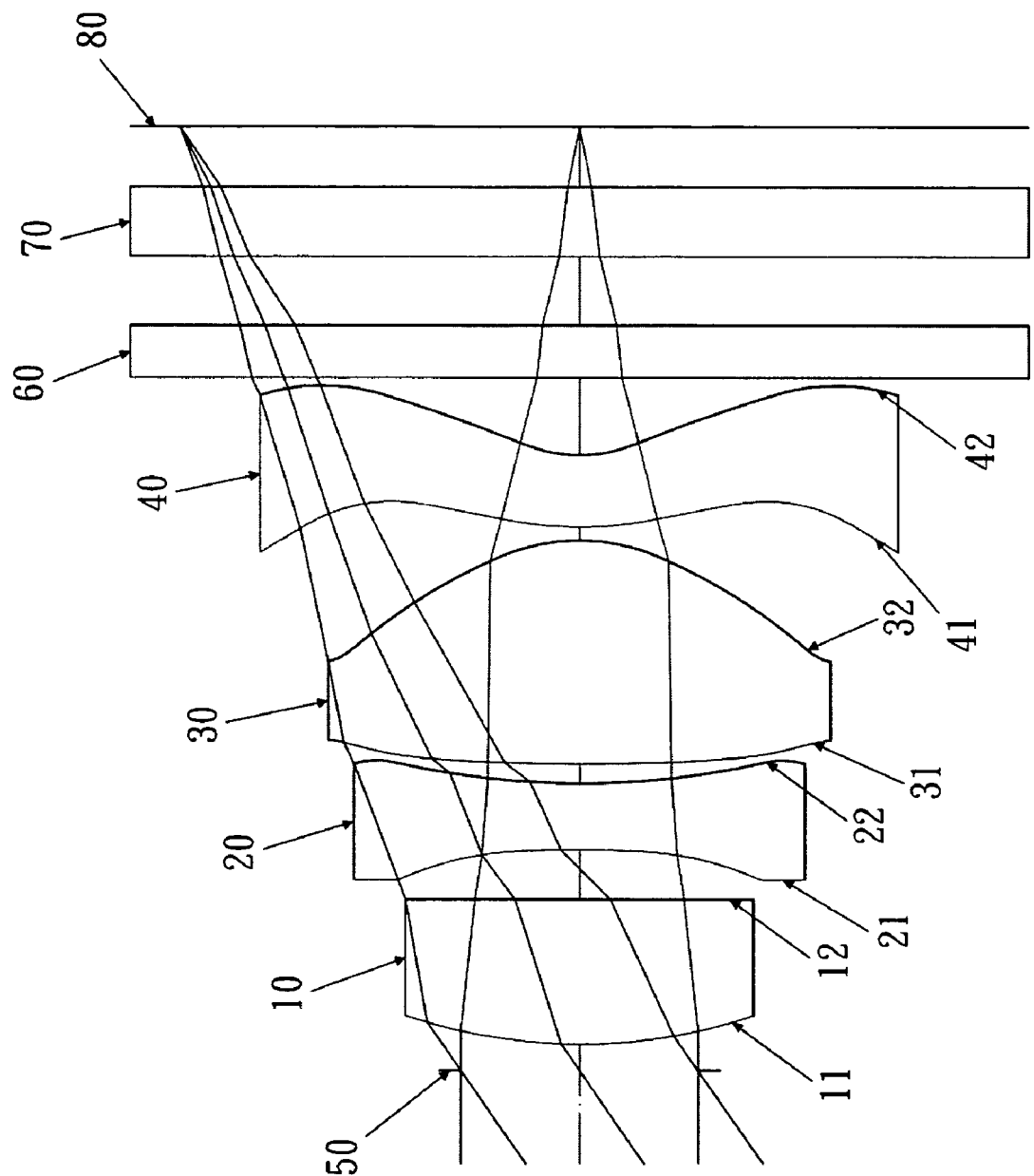
FIG. 5 shows an optical lens system for taking image in accordance with a third embodiment of the present invention.
Figure 6:
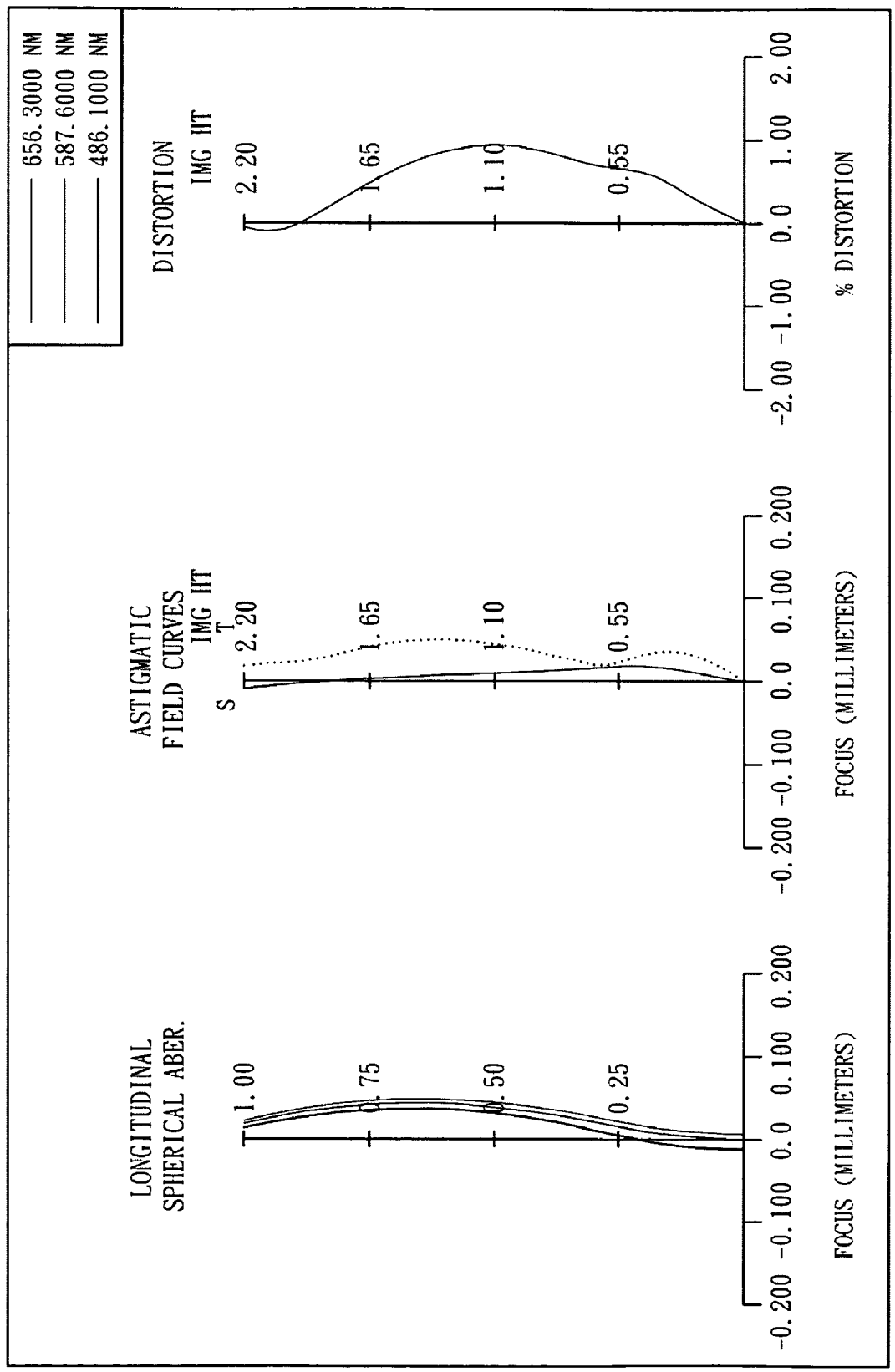
FIG. 6 shows the aberration curve of the third embodiment of the present invention.

Referring to FIG. 5, which shows an optical lens system for taking image in accordance with a third embodiment of the present invention, FIG. 6 shows the aberration curve of the third embodiment of the present invention. The third embodiment of the present invention comprises: in order from the object side to the image side:

A first lens element 10 with positive refractive power has a convex object-side surface 11 and a plane image-side surface 12 and is made of glass, the object-side surface 11 and the image-side surface 12 of the first lens element 10 are both spherical.

A plastic second lens element 20 with negative refractive power has a concave object-side surface 21 and a concave image-side surface 22, the object-side surface 21 and the image-side surface 22 of the second lens element 20 are both aspheric, and inflection points are formed on the image-side surface 22 of the second lens element 20.

A plastic third lens element 30 with positive refractive power has a convex object-side surface 31 and a convex image-side surface 32, the object-side surface 31 and the image-side surface 32 are both aspheric.

A plastic fourth lens element 40 with negative refractive power has a convex object-side surface 41 and a concave image-side surface 42, the object-side surface 41 and the image-side surface 42 are both aspheric.

An aperture stop 50 is located in front of the first lens element 10.

An IR cut filter 60 is located behind the fourth lens element 40 and has no influence on the focal length of the optical lens system.

A sensor cover glass 70 is located behind the IR cut filter 60 and has no influence on the focal length of the optical lens system.

An image plane 80 is located behind the sensor cover glass 70.

The equation for the aspheric surface profiles of the third embodiment has the same form as that of the first embodiment.

In the third embodiment of the present optical lens system for taking image, the focal length of the optical lens system for taking image is f, the focal length of the first lens element and the second lens element combined is f12, the on-axis distance between the second lens element and the third lens element is T23, and they satisfy the relations:

$f=3.24$ mm;

$f12/f=6.20$;

$f/f1=0.82$;

$T23/f=0.04$.

In the third embodiment of the present optical lens system for taking image, the refractive index of the first lens element is N1, and it satisfies the relation:

$N1=1.729$.

In the third embodiment of the present optical lens system for taking image, the Abbe number of the second lens element is V2, and it satisfies the relation:

$V2=30.2$.

In the third embodiment of the present optical lens system for taking image, the radius of curvature of the object-side surface of the third lens element is R5, and it satisfies the relation:

$1R5=0.01$ mm$^{-1}$

In the third embodiment of the present optical lens system for taking image, the radius of curvature of the object-side surface of the first lens element is R1, the radius of curvature of the image-side surface of the first lens element is R2, and they satisfy the relation:

$|R1/R2|=0$. (R2 equals infinity in this case)

In the third embodiment of the present optical lens system for taking image, the edge thickness of the fourth lens element is ET4, the center thickness of the fourth lens element is CT4, and they satisfy the relation:

$ET4/CT4=1.88$.

In the third embodiment of the present optical lens system for taking image, the tangential angle of the object-side surface of the fourth lens element at the position of its effective optical diameter is ANG41, and it satisfies the relation:

$ANG41=-29.2$ deg.

In the third embodiment of the present optical lens system for taking image, the total track length of the optical lens system for taking image is TTL, the maximum image height of the optical lens system for taking image is ImgH, and they satisfy the relation:

$TTL/ImgH=2.38$.

The detailed optical data of the third embodiment is shown in table 5, and the aspheric surface data is shown in table 6, wherein the units of the radius of curvature, the thickness and the focal length are expressed in mm, and HFOV is half of the maximal field of view.

In the present optical lens system for taking image, the lens elements can be made of glass or plastic. If the lens elements are made of glass, the freedom of distributing the refractive power of the optical lens system will be improved. If the lens elements are made of plastic, the cost will be effectively reduced.

TABLE 5

(Embodiment 3)
f(focal length) = 3.24 mm, Fno = 2.43, HFOV (half of field of view) = 34.0 deg.

| Surface # | | Curvature Radius | Thickness | Material | Index | Abbe # | Focal length |
|---|---|---|---|---|---|---|---|
| 0 | Object | Plano | Infinity | | | | |
| 1 | Stop | Plano | 0.15 | | | | |
| 2 | Lens 1 | 2.8933 | 0.830 | Glass | 1.729 | 54.6 | 3.97 |
| 3 | | Plano | 0.291 | | | | |
| 4 | Lens 2 | −8.40270(ASP) | 0.350 | Plastic | 1.583 | 30.2 | −3.8 |
| 5 | | 3.05230(ASP) | 0.117 | | | | |
| 6 | Lens 3 | 100.00000(ASP) | 1.275 | Plastic | 1.544 | 56.1 | 1.90 |
| 7 | | −1.03978(ASP) | 0.070 | | | | |
| 8 | Lens 4 | 1.34265(ASP) | 0.396 | Plastic | 1.583 | 30.2 | −3.31 |
| 9 | | 0.70556(ASP) | 0.450 | | | | |
| 10 | IR-filter | Plano | 0.300 | Glass | 1.517 | 64.1 | |
| 11 | | Plano | 0.400 | | | | |
| 12 | Cover glass | Plano | 0.400 | Glass | 1.517 | 64.1 | |
| 13 | | Plano | 0.349 | | | | |
| 14 | Image | Plano | | | | | |

TABLE 6

Aspheric Coefficients

| | Surface # | | | | | |
|---|---|---|---|---|---|---|
| | 4 | 5 | 6 | 7 | 8 | 9 |
| k = | 0.00000E+00 | 1.50870E+00 | −1.00000E+00 | −6.95584E−01 | −9.74527E+00 | −3.64586E+00 |
| A4 = | −1.51822E−01 | −1.64674E−02 | 1.51275E−01 | 1.33339E−01 | −8.33799E−02 | −9.87783E−02 |
| A6 = | 5.40017E−02 | −6.52002E−02 | −1.46745E−01 | −2.80290E−02 | 1.81573E−02 | 3.55715E−02 |
| A8 = | −1.55531E−02 | 6.06853E−02 | 8.90555E−02 | −9.84134E−03 | −1.14746E−02 | −1.18544E−02 |
| A10 = | | −2.86821E−02 | −2.82733E−02 | 1.01028E−02 | 3.67297E−03 | 2.30026E−03 |
| A12 = | | 2.11455E−03 | 2.83729E−03 | | −3.69999E−04 | −1.82793E−04 |

TABLE 7

|  | Embodiment 1 | Embodiment 2 | Embodiment 3 |
|---|---|---|---|
| f | 3.40 | 3.23 | 3.24 |
| Fno | 2.43 | 2.43 | 2.43 |
| HFOV | 32.6 | 34.0 | 34.0 |
| V2 | 23.4 | 30.2 | 30.2 |
| N1 | 1.544 | 1.729 | 1.729 |
| f12/f | 4.57 | 6.20 | 6.20 |
| f/f1 | 0.73 | 0.78 | 0.82 |
| T23/f | 0.10 | 0.03 | 0.04 |
| ET4/CT4 | 2.02 | 1.90 | 1.88 |
| 1/R5 | 0.02 | 0.01 | 0.01 |
| |R1/R2| | 0.11 | 0.08 | 0.00 |
| ANG41 | −37.6 | −28.1 | −29.2 |
| TTL/ImgH | 2.51 | 2.38 | 2.38 |

It is to be noted that the tables 1-6 show different data from the different embodiments, however, the data of the different embodiments is obtained from experiments. Therefore, any product of the same structure is deemed to be within the scope of the present invention even if it uses different data. Table 7 lists the relevant data for the various embodiments of the present invention.

While we have shown and described various embodiments in accordance with the present invention, it should be clear to those skilled in the art that further embodiments may be made without departing from the scope of the present invention.

What is claimed is:

1. An optical lens system for taking image comprising four lens elements, in order from the object side to the image side:
    a first lens element with positive refractive power having a convex object-side surface;
    a second lens element with negative refractive power having a concave object-side surface and a concave image-side surface, at least one of the object-side surface and the image-side surface of the second lens element being aspheric, inflection points being formed on the image-side surface of the second lens element;
    a third lens element with positive refractive power having a convex object-side surface and a convex image-side surface, an on-axis distance between the second lens element and the third lens element is T23, a focal length of the optical lens system for taking image is f, they satisfy the relation: 0.015<T23/f<0.25; and
    a fourth lens element with negative refractive power, at least one surface of the fourth lens element being aspheric;
    the optical lens system for taking image further having an aperture stop located between the object side and the second lens element.

2. The optical lens system for taking image as claimed in claim 1, wherein the aperture stop is located in front of the first lens element.

3. The optical lens system for taking image as claimed in claim 2, wherein the fourth lens element has a convex object-side surface and a concave image-side surface.

4. The optical lens system for taking image as claimed in claim 3, wherein the second lens element, the third lens element and the fourth lens element are all made of plastic material, and the object-side surfaces and the image-side surfaces of the second lens element, the third lens element and the fourth lens element are all aspheric.

5. The optical lens system for taking image as claimed in claim 4, wherein a focal length of the first lens element and the second lens element combined is f12, the focal length of the optical lens system for taking image is f, and they satisfy the relation:

$3.0<f12/f<8.0$.

6. The optical lens system for taking image as claimed in claim 5, wherein the focal length of the first lens element and the second lens element combined is f12, the focal length of the optical lens system for taking image is f, and they satisfy the relation:

$4.55<f12/f<7.0$.

7. The optical lens system for taking image as claimed in claim 4, wherein the focal length of the optical lens system for taking image is f, a focal length of the first lens element is f1, and they satisfy the relation:

$0.5<f/f1<1.2$.

8. The optical lens system for taking image as claimed in claim 7, wherein the focal length of the optical lens system for taking image is f, the focal length of the first lens element is f1, and they satisfy the relation:

$0.65<f/f1<0.9$.

9. The optical lens system for taking image as claimed in claim 4, wherein an edge thickness of the fourth lens element is ET4, a center thickness of the fourth lens element is CT4, and they satisfy the relation:

$ET4/CT4>1.8$.

10. The optical lens system for taking image as claimed in claim 4, wherein a radius of curvature of the object-side surface of the third lens element is R5, and it satisfies the relation:

$0<1/R5<0.05$ mm$^{-1}$.

11. The optical lens system for taking image as claimed in claim 10, wherein radius of curvature of the object-side surface of the third lens element is R5, and it satisfies the relation:

$0<1/R5<0.025$ mm$^{-1}$.

12. The optical lens system for taking image as claimed in claim 10, wherein a radius of curvature of the object-side surface of the first lens element is R1, a radius of curvature of the image-side surface of the first lens element is R2, and they satisfy the relation:

$|R1/R2|<0.15$.

13. The optical lens system for taking image as claimed in claim 10, wherein the first lens element has a concave image-side surface.

14. The optical lens system for taking image as claimed in claim 10, the first lens element has a convex image-side surface and is made of plastic material, and the object-side surface and the image-side surface of the first lens element are both aspheric.

15. The optical lens system for taking image as claimed in claim 1, wherein the first lens element has a plane image-side surface, and the first lens element is made of glass.

16. The optical lens system for taking image as claimed in claim 1, wherein a refractive index of the first lens element is N1, and it satisfies the relation:

$1.5<N1<1.56$.

17. The optical lens system for taking image as claimed in claim 4, wherein a refractive index of the first lens element is N1, and it satisfies the relation:

$1.52<N1<1.56$.

18. The optical lens system for taking image as claimed in claim 4, wherein an Abbe number of the second lens element is V2, and it satisfies the relation:

$V2<29.$

19. The optical lens system for taking image as claimed in claim 1, wherein a tangential angle of the object-side surface of the fourth lens element at the position of its effective optical diameter is ANG41, and it satisfies the relation:

$ANG41<-25 \text{ deg.}$

20. The optical lens system for taking image as claimed in claim 1 further consisting of an electronic imaging sensor for enabling an object to be photographed to be imaged on it, a total track length of the optical lens system for taking image is TTL, a maximum image height of the optical lens system for taking image is ImgH, and they satisfy the relation:

$TTL/ImgH<2.55.$

* * * * *